No. 748,775. PATENTED JAN. 5, 1904.
J. B. McMULLEN.
WHEEL.
APPLICATION FILED APR. 2, 1903.
NO MODEL. 2 SHEETS—SHEET 1.
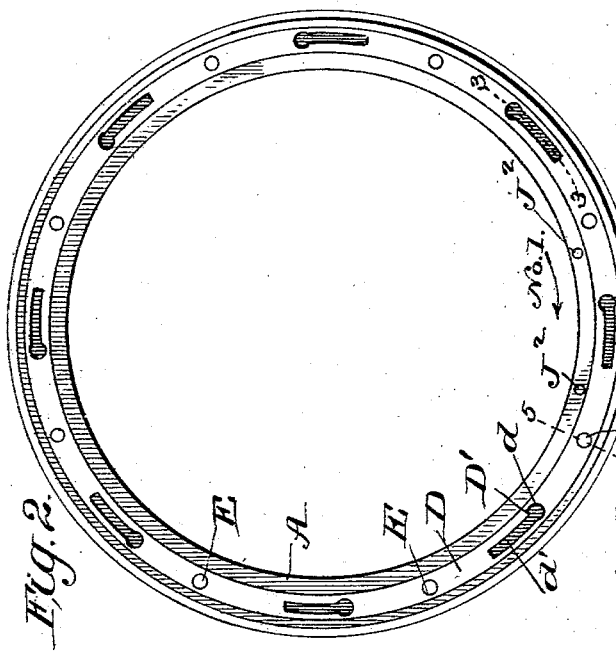
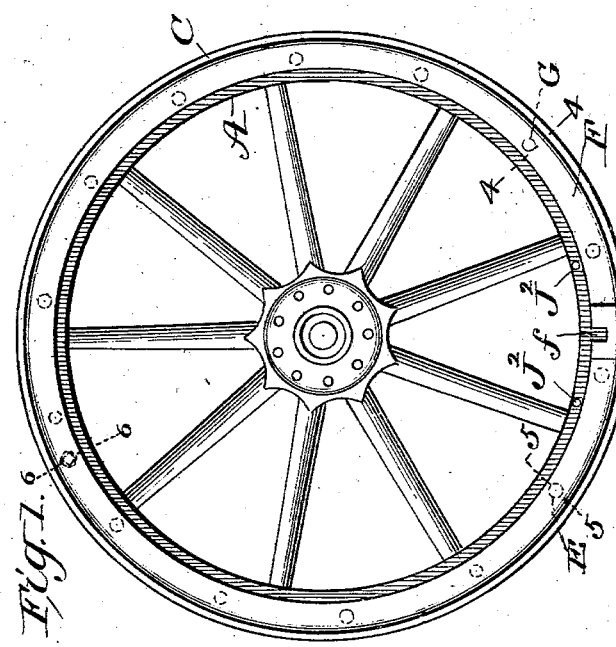
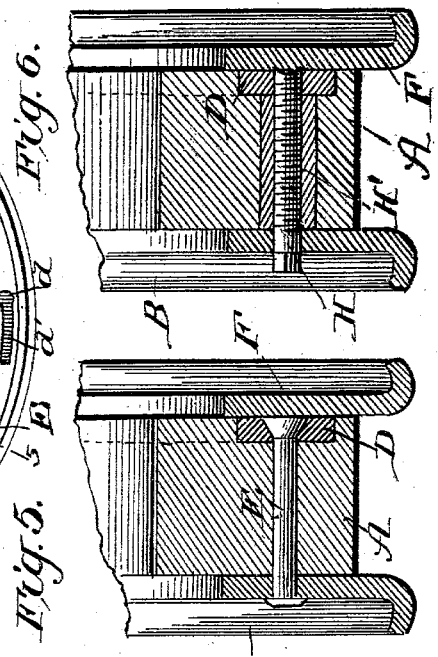
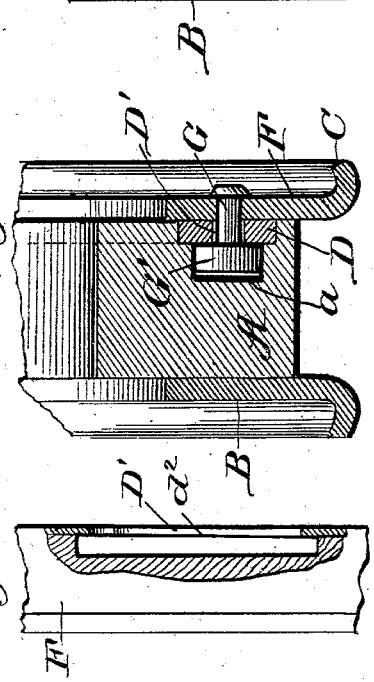
WITNESSES:
Jos. A. Ryan
Perry B. Turpin
INVENTOR
Joseph B. McMullen.
BY Munn & Co.
ATTORNEYS.

No. 748,775. PATENTED JAN. 5, 1904.
J. B. McMULLEN.
WHEEL.
APPLICATION FILED APR. 2, 1903.
NO MODEL. 2 SHEETS—SHEET 2.
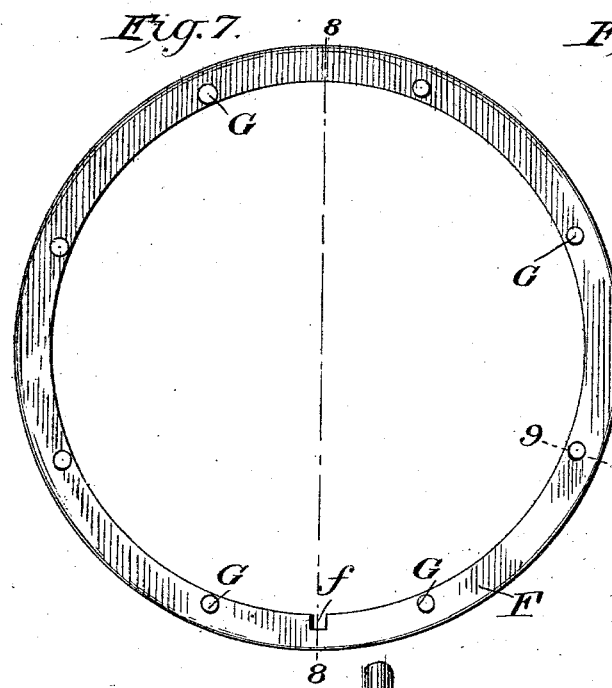
Fig. 7.
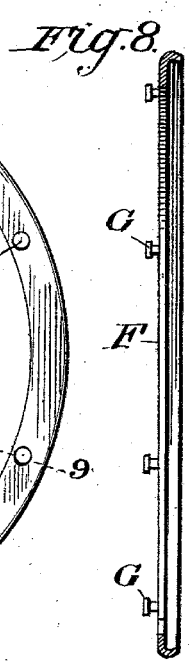
Fig. 8.
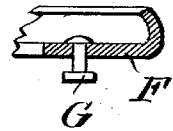
Fig. 9.
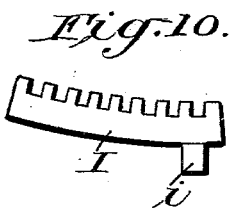
Fig. 10.
Fig. 11.
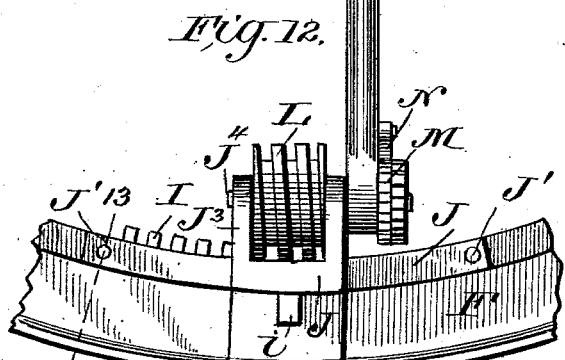
Fig. 12.
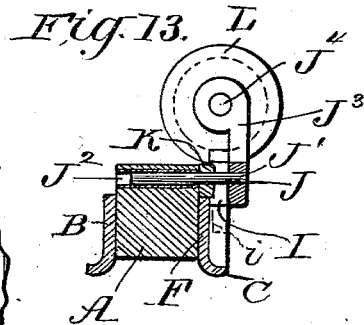
Fig. 13.
Fig. 14.
WITNESSES:
Jos. A. Ryan
Perry B. Turpin
INVENTOR
Joseph B. McMullen
BY Munn & Co.
ATTORNEYS.

No. 748,775. Patented January 5, 1904.

UNITED STATES PATENT OFFICE.

JOSEPH B. McMULLEN, OF HOWARD COUNTY, MARYLAND.

WHEEL.

SPECIFICATION forming part of Letters Patent No. 748,775, dated January 5, 1904.

Application filed April 2, 1903. Serial No. 150,822. (No model.)

*To all whom it may concern:*

Be it known that I, JOSEPH B. MCMULLEN, a citizen of the United States, residing in the county of Howard and State of Maryland, have made certain new and useful Improvements in Wheels, of which the following is a specification.

My invention is an improvement in wheels, and particularly in pneumatic-tire wheels, and has for an object to provide a novel construction of devices for securing the tire and for operating the securing devices; and the invention consists in certain novel constructions and combinations of parts, as will be hereinafter described and claimed.

In the drawings, Figure 1 is a side view of my wheel ready for use. Fig. 2 is a side view of the wheel, the removable side plate and the tire being removed. Fig. 3 is a detail section on about line 3 3 of Fig. 2. Fig. 4 is a cross-section on about line 4 4 of Fig. 1. Fig. 5 is a cross-section on about line 5 5 of Fig. 1. Fig. 6 is a cross-section on about line 6 6 of Fig. 1. Fig. 7 is a detail side view of the removable plate or flange. Fig. 8 is a sectional view thereof on about line 8 8 of Fig. 7. Fig. 9 is a detail cross-section on about line 9 9 of Fig. 7. Fig. 10 is a detail side view of the worm-rack. Fig. 11 is a detail side view of the bearing-frame for the worm. Fig. 12 is a side view of a portion of the wheel with the gearing devices applied for use in adjusting the removable flange-plate into and out of position to retain the tire. Fig. 13 is a detail cross-section on about line 13 13 of Fig. 12, and Fig. 14 is a detail side view of the curved plate which coöperates with the bearing-frame shown in Fig. 11 in the manner presently described.

The wheel is constructed with a body portion or rim A, having at one side the flange-ring B permanently secured in place and projecting beyond the circumference of the rim A to operate to retain the tire in one side, the tire C being slipped onto the rim A from the side opposite the plate B when the removable side plate is off the rim. In the side of the rim A opposite the plate B I seat a rim-plate D, which may be secured in place by the bolts E, as shown in Figs. 2 and 5, the outer face of the plate D resting flush with the outer face of the rim A and the heads of the bolts or rivets E being countersunk in the plate D, as shown in Fig. 5. This plate D is provided at intervals with the keyhole-slots D', having the head portions $d$ and the extension-wings $d'$, and the plate D is tapered or inclined along the inner sides of the slots D', as shown at $d^2$ in Fig. 3, so the heads of the studs presently described may be clamped by such taper or incline operating as a wedge when the said heads are adjusted in the recesses $a$ toward the ends of the keyhole-slots opposite the head portions $d$, as will be understood from Figs. 2, 3, and 4.

The side plate F at the outer side of the rim A is arranged to project beyond the said rim when applied thereto, as shown in Figs. 4, 5, and 6, and coöperate with the projecting portion of the plate B in securing the tire upon the rim A. This plate F is provided at intervals corresponding to those of the slots D' with studs G, which project from the inner side of the plate F and are provided with heads G' to project through the portions $d$ of the keyhole-slots D' and operate in the recesses $a$ and beneath the plate D when the studs G' are adjusted by moving the plate F in a circular line from a position where heads G' will enter the portions $d$ toward the opposite ends of the keyhole-slots, as will be understood from Figs. 2 and 4.

In operation if the rim be as shown in Fig. 2, with the plate B thereon and the plate F removed, the tire C may be placed on and removed from the wheel at pleasure. If the tire be now fitted on the rim and the plate F be applied, with its stud-heads G' projecting through the head portions $d$ of the keyhole-slots, and the said plate F be turned in the direction of the arrow No. 1 in Fig. 2, the studs G will enter the wing portions $d'$ of the keyhole-slot, and the heads G' will engage beneath the plate D, and the plate F will thus be held to the rim of the wheel, the stud-heads G' riding on the tapered surface $d^2$ of the plate D and being drawn thereby toward the head to press the plate F firmly against the outer side of the rim as desired. In order to lock the plate F when adjusted into engagement with the rim A, as described, I provide a clamping-screw H, passed through the plate B and turning through a nut H', seated in the rim A, and through the plate D and pressing at its point against the inner side of the plate F to lock the same from any accidental displacement.

In order to operate the plate F into and out of position, wherein the said plate engages with the plate D, as before described, I provide the plate F with a notch at $f$ for engagement by a lug $i$ on a worm-rack I, said worm-rack being seated upon the inner edge of the plate F and operating between the outer and inner plates J and K, the outer plate J being provided with pins J', which fit in openings $J^2$ in the rim A, (see Fig. 1,) and said outer plate being also provided with ears $J^3$, having bearings $J^4$ for the worm L, which meshes with the rack I, and has the oppositely-facing ratchet-wheels M for engagement by pawl N on the lever O, so said lever O may be reciprocated to turn the worm L in either direction, and thus cause the rack I to move in one or the other direction in order to turn the plate F into and out of engagement with the slotted bearing-plate D, secured to the rim of the wheel. By this means I am able to forcibly operate the plate F into and out of engagement with the wheel by a simple appliance, which may be applied to and removed from the wheel at pleasure.

Having thus described my invention, what I claim as new, and desire to secure by Letters Patent, is—

1. The improvement in wheels herein described, comprising the body or rim, the plate secured to one side thereof and projecting beyond the periphery of the rim, the plate seated in the opposite side of the rim and provided with keyhole-slots and having the under sides of said plates alongside the extension-wings of such slots tapered as described, the movable side plate provided with inwardly-projecting studs having heads to operate in the keyhole-slots, of the slotted plates, said removable plates being provided with a notch to be entered by the lug on the worm-rack, the worm-rack having a lug entering said slot, and the bearing-plate, the worm journaled therein and engaging with the worm-rack, and devices for securing the bearing-plate to the rim of the wheel, substantially as set forth.

2. The combination of the wheel-rim, the side plate secured to one side thereof and projecting beyond the periphery of the rim, the plate secured to the other face of the rim, and provided with keyhole-slots, and having its inner surface alongside the extension-wings of said slots tapered, and the removable side plate provided with inwardly-projecting studs having heads and arranged to operate in the keyhole-slot of the rim-plate, substantially as set forth.

3. The combination of the rim, the plate secured to one side thereof, the plate secured to the opposite side of the frame and having keyhole-slots, and the plate provided with inwardly-projecting studs provided with heads and arranged to operate in the keyhole-slots of the rim-plate, substantially as described.

4. The combination with the rim, and the plate secured thereto and having keyhole-slots, of the plate for application to the rim and provided with headed studs to operate in the keyhole-slots of the rim-plate, substantially as described.

5. The combination of the rim provided at one side with the plate for retaining the tire, the plate for application to the opposite side of the rim, means for securing the latter plate detachable to the rim and the clamping-screw for binding the detachable plate in connection with the rim, substantially as set forth.

6. The combination with the rim having the side plate projecting to retain the tire, of the opposite side plate provided with means for detachably securing it to the rim, the worm-rack having means for engagement with the detachable side plate, the frame guiding said rack and secured to the rim of the wheel, and the worm journaled in said frame and meshing with the rack-bar, substantially as set forth.

7. The rim and the tire-securing flange or plate at one side thereof, combined with the detachable plate or flange at the other side of the rim and interlocking devices for securing the detachable plate, the latter being movable in a circular direction into and out of engagement with the interlocking devices substantially as set forth.

JOSEPH B. McMULLEN.

Witnesses:
SOLON C. KEMON,
PERRY B. TURPIN.